United States Patent
Antoni

(10) Patent No.: US 12,240,594 B2
(45) Date of Patent: Mar. 4, 2025

(54) AIRCRAFT LANDING GEAR COMPRISING A SPRING OPPOSING ROTATION BETWEEN UPPER AND LOWER ELEMENTS OF THE LANDING GEAR

(71) Applicant: SAFRAN LANDING SYSTEMS, Velizy-Villacoublay (FR)

(72) Inventor: Nicolas Antoni, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 64 days.

(21) Appl. No.: 17/995,334

(22) PCT Filed: Apr. 2, 2021

(86) PCT No.: PCT/EP2021/058803
§ 371 (c)(1),
(2) Date: Oct. 3, 2022

(87) PCT Pub. No.: WO2021/198514
PCT Pub. Date: Oct. 7, 2021

(65) Prior Publication Data
US 2023/0202648 A1    Jun. 29, 2023

(30) Foreign Application Priority Data
Apr. 3, 2020 (FR) ..................... 2003337

(51) Int. Cl.
*B64C 25/62* (2006.01)
(52) U.S. Cl.
CPC ................... *B64C 25/62* (2013.01)
(58) Field of Classification Search
CPC .................................................. B64C 25/62
See application file for complete search history.

(56) References Cited

U.S. PATENT DOCUMENTS

| 1,855,020 A | 4/1932 | Henrichsen |
| 3,144,233 A * | 8/1964 | Pelley ............... B65F 1/1421 |
| | | 248/346.07 |

(Continued)

FOREIGN PATENT DOCUMENTS

| CN | 108820191 A | * 11/2018 | ........... B64C 25/505 |
| CN | 111994257 A | * 11/2020 | |
| RU | 2107013 C1 | * 3/1998 | |

OTHER PUBLICATIONS

English translation of Written Opinion mailed Jun. 11, 2021, issued in corresponding International Application No. PCT/EP2021/058803, filed Apr. 2, 2021, 6 pages.

(Continued)

*Primary Examiner* — Brady W Frazier
*Assistant Examiner* — Shanna Danielle Glover
(74) *Attorney, Agent, or Firm* — CHRISTENSEN O'CONNOR JOHNSON KINDNESS PLLC

(57) ABSTRACT

An aircraft undercarriage includes an upper element for connecting to an aircraft structure and a lower element carrying an axle. The lower element is mounted to be movable in translation relative to the upper element along a longitudinal axis, and a shock absorber is arranged to damp movements in translation of the lower element relative to the upper element.

First and second portions of a spring are connected respectively to the upper element and to the lower element so that during movement in translation of the lower element relative to the upper element, the spring opposes any turning of the lower element relative to the upper element about said longitudinal axis.

13 Claims, 4 Drawing Sheets

(56) References Cited

U.S. PATENT DOCUMENTS

| | | | |
|---|---|---|---|
| 4,172,570 A | 10/1979 | Leoni | |
| 2017/0217574 A1 | 8/2017 | Dufault | |
| 2022/0306287 A1* | 9/2022 | Bidmead | ............ F16H 25/2015 |

OTHER PUBLICATIONS

International Preliminary Report on Patentability mailed Sep. 29, 2022, issued in corresponding International Application No. PCT/EP2021/058803, filed Apr. 2, 2021, 7 pages.

International Search Report mailed Jun. 11, 2021, issued in corresponding International Application No. PCT/EP2021/058803, filed Apr. 2, 2021, 5 pages.

Written Opinion mailed Jun. 11, 2021, issued in corresponding International Application No. PCT/EP2021/058803, filed Apr. 2, 2021, 6 pages.

\* cited by examiner

AIRCRAFT LANDING GEAR COMPRISING A SPRING OPPOSING ROTATION BETWEEN UPPER AND LOWER ELEMENTS OF THE LANDING GEAR

FIELD OF THE DISCLOSURE

The present disclosure relates to the field of undercarriages that comprise an upper element for connection to a structure of the aircraft and a lower element carrying an axle, the lower element being mounted to move in translation relative to the upper element along a longitudinal axis, and a shock absorber being arranged to damp the movements in translation of the lower element relative to the upper element.

BACKGROUND

By way of example, document EP1786669 A1 discloses a known undercarriage that comprises an upper element (specifically the upper element is a main strut of the undercarriage) for connection to an aircraft structure, and a lower element carrying an axle of the aircraft (specifically the lower element is a slidable rod of the undercarriage that slides inside the strut).

The lower element is mounted to move in translation relative to the upper element along a longitudinal axis of the upper element, and a shock absorber is arranged to damp movements in translation of the lower element relative to the upper element.

In order to oppose the lower element turning relative to the upper element, while still allowing those elements to move in translation along the longitudinal axis, the undercarriage includes a torque link.

The torque link comprises an upper arm and a lower arm, which arms are hinged to each other about a main axis of the torque link extending in a plane perpendicular to the longitudinal axis of the upper element.

The upper arm of the torque link is pivotally mounted relative to the upper element about a first connection axis that is parallel with the main axis of the torque link.

The lower arm of the torque link is pivotally mounted relative to the lower element about a second connection axis that is parallel with the main axis of the torque link.

When a large torque is applied to turn the lower element relative to the upper element about the longitudinal axis, it is observed that the main axis of the torque link can become deformed, which can present a risk of the torque link being damaged under repeated loading and can lead to its service life being limited.

An object of the present disclosure is to provide an undercarriage that minimizes some or all of the above-mentioned drawbacks.

SUMMARY

For this purpose, the disclosure provides an aircraft undercarriage comprising an upper element for connecting to an aircraft structure, a lower element carrying an axle, the lower element being mounted to be movable in translation relative to the upper element along a longitudinal axis of symmetry of the upper element, and a shock absorber arranged to damp movements in translation of the lower element relative to the upper element.

The undercarriage is essentially characterized in that it includes a spring having first and second portions that are spaced apart from the longitudinal axis, the first portion of the spring being secured to the upper element and the second portion of the spring being secured to the lower element in such a manner that during movement in translation of the lower element relative to the upper element the spring opposes any turning of the lower element relative to the upper element about the longitudinal axis.

Thus, the spring allows the lower element of the undercarriage to move in translation relative to the upper element along the longitudinal axis of symmetry of the upper element, while also providing mechanical coupling in rotation between the lower element and the upper element about that same longitudinal axis.

The undercarriage of the disclosure may be:
  in a first situation, an undercarriage with an axle that is not steerable (while the aircraft is taxiing on the ground) about the longitudinal axis relative to the structure of the aircraft; or else
  in a second situation, an undercarriage with an axle that is steerable (while the aircraft is taxiing) about the longitudinal axis relative to the structure of the aircraft (the wheels carried by the axle are then steerable during taxiing about the longitudinal axis in order to define a taxiing direction).

In each of the first and second situations, the spring provides mechanical coupling between the upper element and the lower element such that:
  firstly it exerts elastic return torque along the longitudinal axis of the upper element for returning the lower element towards a position of given orientation relative to the other elements; and
  secondly it exerts a elastic force tending to oppose the lower element coming closer to the upper element along the longitudinal axis of the element.

In the first situation, while taxiing, the spring keeps the axle in an orientation that is fixed relative to the structure of the aircraft, while allowing the lower element to slide relative to the upper element (with the shock absorber having the function of damping such sliding movement).

In the second situation, the orientation of the lower element and of its axle is determined by steering the upper element relative to the structure of the aircraft. Under such circumstances, the spring provides mechanical coupling in rotation between the upper element and the lower element in such a manner that the upper and lower elements are constrained to turn together about the longitudinal axis and can be steered together.

In both situations, the spring performs the essential functions that are normally performed by a torque link, while simplifying the connection between the upper and lower elements.

The disclosure also provides an aircraft fitted with at least one undercarriage of the disclosure in accordance with any of the undercarriage embodiments described below.

DESCRIPTION OF THE DRAWINGS

Other characteristics and advantages of the disclosure appear clearly from the following description given by way of nonlimiting indication and with reference to the accompanying drawings, in which.

DETAILED DESCRIPTION

Usually, an aircraft has a plurality of main undercarriages, each situated closer to the wings of the aircraft than to its cockpit, together with a nose undercarriage that is situated closer to the cockpit than to the wings.

Each main undercarriage generally has at least one axle that, during taxiing of the aircraft, is of an orientation that is generally fixed relative to a longitudinal plane of symmetry of the aircraft, the axle being substantially perpendicular to the longitudinal plane of symmetry of the aircraft.

A nose undercarriage generally includes at least one steering actuator and an axle that is steerable under the effect of the steering actuator. Steering the axle serves to change the direction in which the aircraft taxies on the ground.

Preferably, the main undercarriage is arranged to be configured to support a mode that is greater than the maximum acceptable mode for the nosewheel undercarriage, since the main function of the main undercarriage is to support the weight of the aircraft, while the nosewheel undercarriage has the functions both of supporting the aircraft and also of steering the axle during taxiing.

Figure 1:
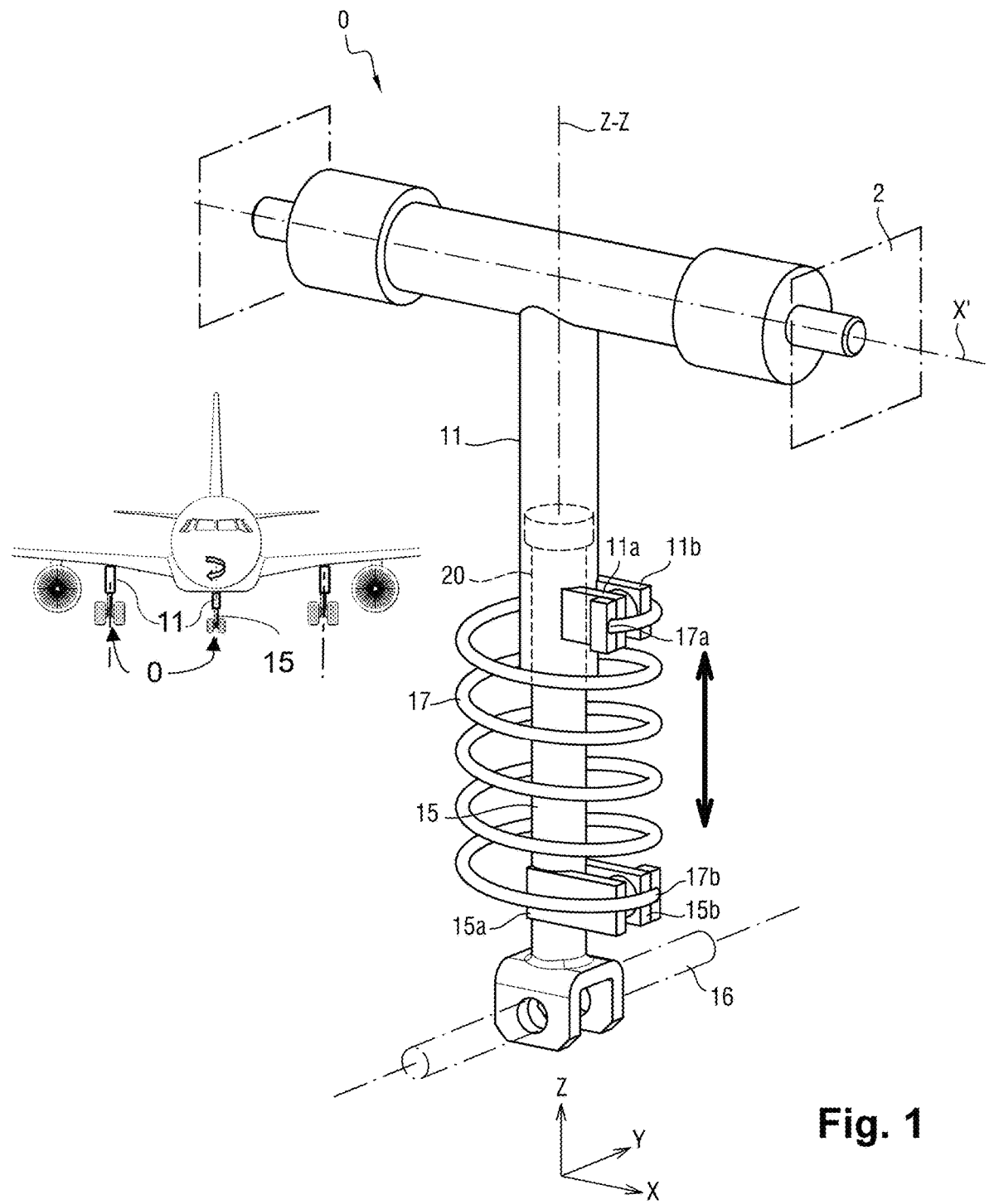
FIG. 1 is a diagrammatic perspective view of an undercarriage of the disclosure in an extended configuration in which it presents a maximum length (the shock absorber 20 and the spring 17 then being compressed little along the longitudinal axis Z-Z)
Figure 2:
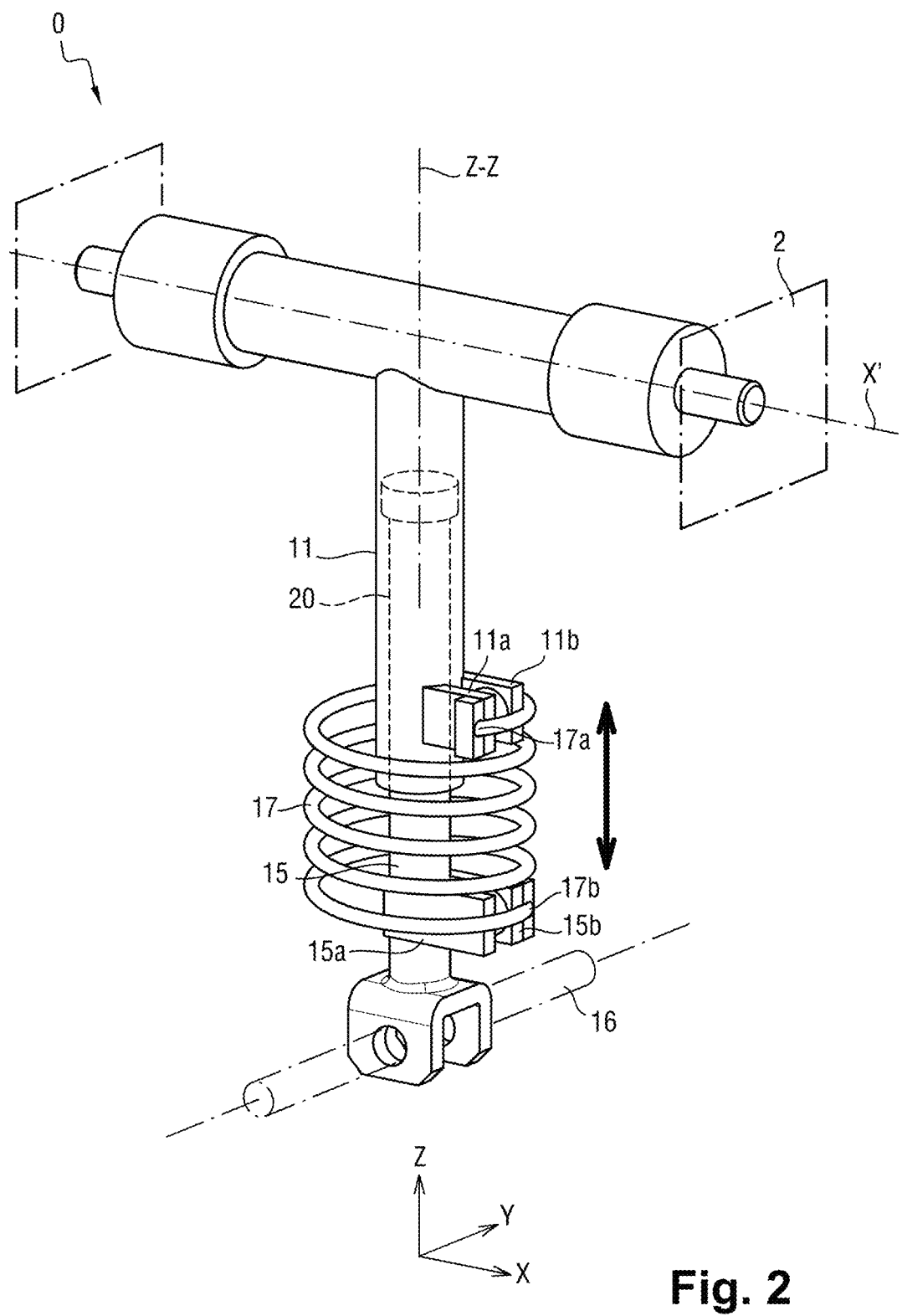
FIG. 2 is a view of the FIG. 1 undercarriage while it is in a compressed configuration in which it presents a length that is shorter than the maximum length (the shock absorber 20 and the spring 17 then being compressed considerably along the longitudinal axis Z-Z, with the axle 16 then being located closer to the structure 2 of the aircraft by sliding movement in translation along a direction parallel to the longitudinal axis Z-Z)
Figure 3:
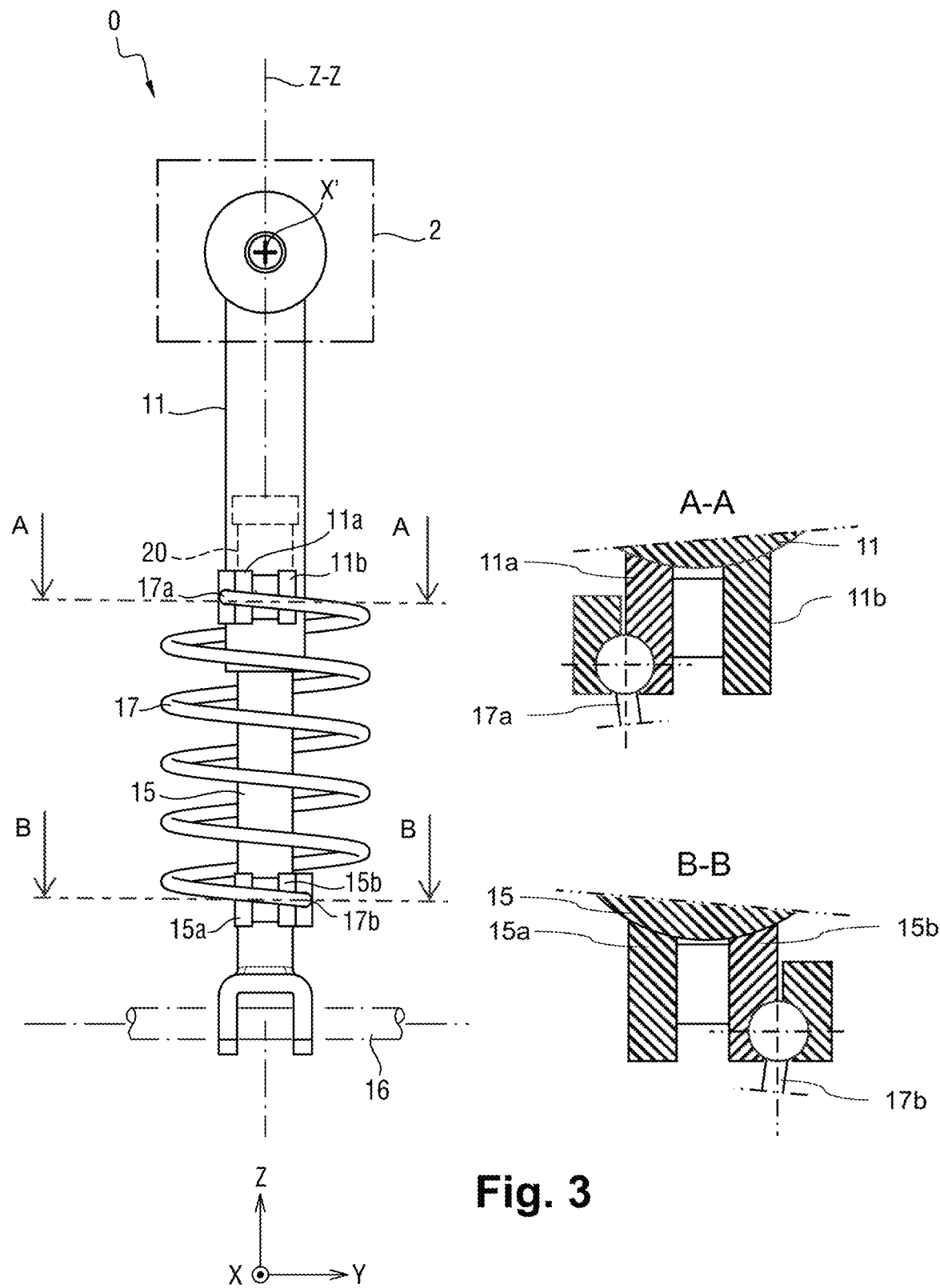
FIG. 3 is a side view of the FIG. 1 undercarriage while it is in its extended configuration, FIG. 3 showing the positions of the first and second portions 17a and 17b of the spring 17 relative to the longitudinal axis Z-Z, the first and second portions 17a and 17b being arranged to limit any risk of generating interfering torque tending to turn the lower element relative to the upper element while the spring is being compressed.
Figure 4:
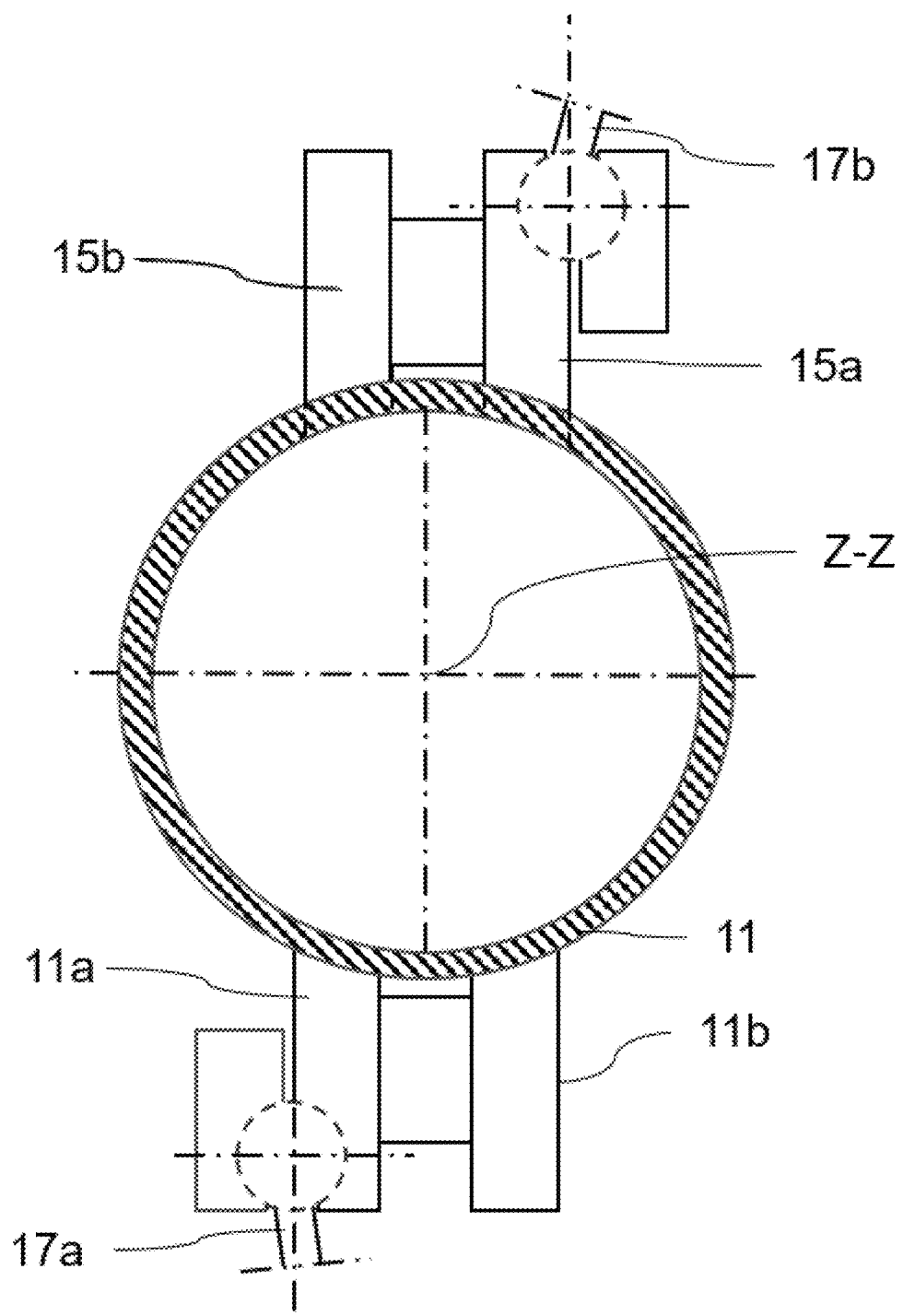
FIG. 4 illustrates an aircraft undercarriage according an implementation mode of the invention wherein, when observed in an observation direction that is parallel to the longitudinal axis Z-Z of the upper element the first and second portions of the spring appear on opposite sides of said longitudinal axis. In this FIG. 4, the first and second portions of the spring lie in a common first plane containing said longitudinal axis Z-Z.

The aircraft undercarriage 0 shown in FIGS. 1 to 3 is a main undercarriage, having an upper element 11 that is a main strut and a lower element 15 that is a rod slidably mounted to slide inside the strut.

As shown in FIGS. 1 to 3, the upper element 11 is for connection directly or indirectly to a structure 2 of an aircraft, and the lower element 15, which is carried by the upper element 11, itself carries an axle 16.

The axle 16 is arranged to be fitted with at least one wheel (not shown) that is rotatably mounted on the axle with the plane of the wheel being perpendicular to a main axis of symmetry of the axle.

In the figure, the aircraft structure 2 is represented in simplified manner by two zones of the structure 2 that together form an attachment for the upper element 11.

In this example, the upper element 11 that is carried by the aircraft structure is mounted to pivot relative to these zones of the structure 2 via a pivot connection having a single axis X'.

As in most known undercarriages, the undercarriage of the disclosure may include a main stay (not shown in figures).

Such a stay generally comprises upper and lower arms connected together by a bend. The upper and lower arms are either in alignment with each other in order to keep the undercarriage in a deployed state outside the aircraft structure, or else they are folded towards each other when the undercarriage is in a retracted state inside the structure of the aircraft. Such a stay may be fitted with means for locking it in position when the upper and lower arms are in alignment.

An orthonormal frame of reference formed by three normalized vectors X, Y, Z is shown in each of FIGS. 1 to 3.

The vector Y is parallel to the direction of the longitudinal axis of the axle 16.

The vector Z coincides with the direction of the longitudinal axis Z-Z of the upper element 11.

The vector X is perpendicular to the vectors Y and Z and it points in the taxiing direction of the wheel(s) fitted to the axle 16.

In this example, the axis X' forming the pivot connection of the undercarriage 0 to the structure 2 of the aircraft has a direction that is substantially parallel to the direction of the vector X, but it could have some other orientation depending on the way the connection is made between the undercarriage 0 and the structure 2.

The lower element 15 is slidably mounted to slide relative to the upper element 11 along the longitudinal axis of symmetry Z-Z of the upper element 11.

Specifically, in this example, the lower element 15 is mounted to slide inside the upper element 11

A shock absorber 20 is arranged to damp movements in translation of the lower element 15 relative to the upper element 11 along the axis Z-Z.

The shock absorber 20 exerts elastic return forces on the lower element 15 urging it towards a stable position for the lower element 15 relative to the upper element 11, and it also exerts forces for damping the movement in translation of the lower element 15 relative to the upper element 11.

The undercarriage 0 is thus deformable between a compressed configuration as shown in FIG. 2, in which it presents a length that is shorter than a maximum length, and an extended configuration as shown in FIGS. 1 and 3, in which it presents a maximum length.

When the undercarriage 0 goes from its extended configuration to its compressed configuration, the lower element 15 passes through the stable position relative to the upper element.

The undercarriage of the disclosure also includes at least one spring 17 comprising first and second portions 17a and 17b that are spaced apart from the longitudinal axis Z-Z.

In this example, the first and second portions 17a and 17b of the spring are terminal ends of the spring 17. The first portion 17a of the spring is secured to the upper element 11 (i.e. the first portion 17a of the spring is mechanically coupled so that it moves together with the upper element 11), and the second portion 17b of the spring 17 is secured to the lower element 15 (i.e. the second portion 17b of the spring is mechanically coupled so that it moves together with the lower element 15) in such a manner that during movement in translation of the lower element 15 relative to the upper element 11, the spring 17 opposes any turning movement of the lower element 15 relative to the upper element 11 about the longitudinal axis Z-Z.

The spring 7 provides mechanical coupling in turning between the upper element 11 and the lower element 15, which coupling is elastic.

Thus, the spring 17 constitutes an elastically-deformable connection between the upper and lower elements 11 and 15.

The lower element 15 and the second portion of the spring 17b move together relative to the upper element 11, both in translation along a translation direction parallel to the axis Z-Z, and also in rotation about this direction parallel to the axis Z-Z.

The spring 7 is a helical spring extending along a longitudinal axis of the spring that is parallel to the longitudinal axis Z-Z of the upper element 11.

This longitudinal axis of the spring preferably coincides with the longitudinal axis Z-Z of the upper element.

The spring is compressible along this longitudinal axis of the spring 17 by moving the first portion 17a towards the second portion 17b, and it presents elastic stiffness in compression along the longitudinal axis Z-Z that is identical to its elastic stiffness in traction along the longitudinal axis Z-Z.

In other words, over the operating range of the spring, when the undercarriage goes from its extended configuration to its compressed configuration, the elastic stiffness of the spring while it is being subjected to traction tending to move the first and second portions 17a and 17b apart from each other along a direction parallel to the longitudinal axis of the spring is similar (ignoring variations that are a function of the characteristics of the undercarriage), or more particularly that is identical (to within ±10%) to the elastic stiffness of the spring while it is being subjected to compression tending to move the first and second portions of the spring towards each other along the same direction.

The helical spring 17 presents a plurality of turns extending between the first and second portions 17a and 17b, with some of the turns extending around the upper element 11 and other turns extending around the lower element 15.

Thus, the elastic return forces urging the undercarriage towards its extended configuration are generated essentially by the shock absorber 20 and to a lesser extent by the spring 17.

When observing the undercarriage in a direction that is parallel to the longitudinal axis Z-Z of the upper element, the first and second portions 17a and 17b of the spring 17 appear on opposite sides of the longitudinal axis Z-Z of the upper element 11.

In other words, the first and second portions 17a and 17b of the spring preferably lie in a common first plane containing the longitudinal axis Z-Z, while being on opposite sides of a second plane also containing the longitudinal axis Z-Z, the second plane being perpendicular to the first plane.

While taxiing, the lower element 15 slides along the longitudinal axis Z-Z of the upper element 11 and the particular arrangement of the first and second portions of the spring 17 relative to the longitudinal axis Z-Z serves to avoid generating interfering torque tending to turn the lower element relative to the upper element.

Preferably, and as shown in FIGS. 1 to 3, the upper element 11 has two portions 11a and 11b that project outwards from the upper element 15, radially relative to the longitudinal axis Z-Z.

These two portions 11a and 11b of the upper element 11 constitute a clevis that is conventionally used for mounting a first arm of a torque link.

Likewise, the lower element 15 has two portions 15a and 15b that project outwards from the lower element 15, radially relative to the longitudinal axis Z-Z.

These two portions 15a and 15b of the lower element 15 constitute a clevis that is conventionally used for mounting a second arm of a torque link.

The first portion 17a of the spring is secured to the upper element 11 via at least one of these portions 11a and 11b of the upper element 11.

In similar manner, the second portion 17b of the spring 17 is preferably secured to the lower element 15 via at least one of these portions 15a and 15b of the lower element 15.

By assembling a spring 17 to the clevises that are usually used for connecting a torque link, it is thus possible to obtain an undercarriage of the disclosure in inexpensive manner.

More particularly, the first portion 17a of the spring is secured to the upper element via a first ball joint connection and the second portion 17b of the spring is secured to the lower element via a second ball joint connection.

Specifically, the first ball joint connection comprises first and second parts forming a first ball joint. The first part of the first ball joint connection is fixedly connected to the first portion 17a of the spring, and the second part of the first ball joint connection is fixedly connected to the upper element 11.

In similar manner, the second ball joint connection comprises third and fourth parts forming a second ball joint. The third part of the second ball joint connection is fixedly connected to the second portion 17b of the spring, and the fourth part of the second ball joint connection is fixedly connected to the lower element 15.

These ball joint type connections contribute to eliminating torques and/or moments that could cause the lower element 15 to turn relative to the upper element 11 during axial movement of the lower element 15 along the axis Z-Z.

The spring is arranged to generate an elastic return torque on the lower element about the longitudinal axis, urging the lower element towards a predetermined angular rest position relative to the upper element.

To do this, the spring presents first elastic stiffness opposing turning of the lower element relative to the upper element about the longitudinal axis.

This first elastic stiffness is such that, so long as the torque transmitted between the upper element 11 and the lower element 15 remains less than a predetermined maximum torque value, the spring 17 guarantees that turning of the lower element 15 relative to the upper element 11 remains less than a predetermined maximum steering angle. This predetermined maximum steering angle is determined in such a manner as to guarantee stability of the taxiing direction while taxiing.

In the event of the predetermined maximum torque value been exceeded, the lower element 15 may be observed to pivot temporarily relative to the upper element 11 beyond the predetermined maximum steering angle without risk of damaging the undercarriage.

The spring then forces the lower element to return towards the predetermined angular rest position.

To do this, the spring 17 preferably presents a minimum value Jmin of elastic stiffness in twisting opposing pivoting of the lower element 15 relative to the upper element 11 about the longitudinal axis Z-Z as given by the following equation:

$$J_{min} = C_{max}/|\theta_1 - \theta_2|_{max}$$

in which Cmax is the magnitude of the maximum authorized pivoting torque of the lower element 15 relative to the upper element 11 about the longitudinal axis Z-Z (Cmax is a predetermined maximum torque value that the undercarriage must be configured to withstand in use); and in which |θ1−θ2| max is a maximum authorized angle of rotation for the lower element 15 relative to the upper element 11 about the longitudinal axis Z-Z expressed as its absolute value.

This value |θ1−θ2| max is a predetermined value that depends on the behavior expected of the undercarriage while it is in use. By way of example, it is possible to select |θ1−θ2| max as being less than 3° of angle, preferably less than or equal to 1° of angle.

This minimum elastic stiffness in twisting Jmin is selected so that, within a range of forces, the angular orientation of the axle relative to the structure of the aircraft is maintained at a value that is compatible with stable taxiing, even in the event of an impact against the lower element 15 of the undercarriage 0.

Preferably, the shock absorber 20 presents elastic stiffness opposing deformation of the shock absorber along the longitudinal axis Z-Z that is several times greater than the elastic stiffness of the spring 17 opposing deformation of the spring along the same longitudinal axis Z-Z.

The disclosure makes it possible to omit the torque link that normally connects the upper element to the lower element by replacing it with a spring, thereby achieving a saving in weight, eliminating undesirable effects of secondary moments, and providing an elastic return effect parallel to that exerted by the shock absorber 20.

The disclosure is not limited to the examples described above, and it covers any variant coming within the ambit defined by the claims.

In particular, the disclosure covers all variants in which the stiffness of the spring, the shape of its turns, its diameter, and its un-stressed length are determined as a function of the type of undercarriage, of its architecture, and of the expected performance.

It should be observed that the undercarriage of the disclosure could be a nose undercarriage, with the upper element 11 then being a tube that is pivotally mounted relative to a shaft of the undercarriage, preferably to pivot about the axis Z-Z, the shaft of the nose undercarriage then extending at least in part inside the turnable tube.

The shaft of the nose undercarriage is hinged to the structure of the aircraft to enable it to pass from a deployed position outside the structure of the aircraft to a retracted position inside the structure of the aircraft, with the upper element, specifically the tube, then being connected to the structure of the aircraft via the shaft. An actuator would then be used to cause the upper element to pivot relative to the shaft, thereby steering the lower element together with its axle while taxiing.

The invention claimed is:

1. An aircraft undercarriage comprising an upper element configured to be connected to an aircraft structure, a lower element carrying an axle, said lower element being mounted to be movable in translation relative to the upper element along a longitudinal axis of the upper element, and a shock absorber configured to damp movements in translation of the lower element relative to the upper element, wherein the undercarriage includes a spring having first and second portions that are spaced apart from said longitudinal axis, the first portion of the spring being secured to the upper element and the second portion of the spring being secured to the lower element in such a manner that during movement in translation of the lower element relative to the upper element the spring opposes any turning of the lower element relative to the upper element about the longitudinal axis,
wherein said spring is a helical spring that is compressible along a longitudinal axis of the spring by moving the first portion closer to the second portion, and
wherein the first portion of the spring is secured to the upper element via a portion of the upper element that projects outwards from the upper element, radially relative to the longitudinal axis of the upper element, and wherein the second portion of the spring is secured to the lower element via a portion of the lower element that projects outwards from the lower element, radially relative to the longitudinal axis of the upper element.

2. The aircraft undercarriage according to claim 1, wherein said spring presents elastic stiffness in compression along said longitudinal axis.

3. The aircraft undercarriage according to claim 2, wherein said spring also presents elastic stiffness in traction along said longitudinal axis said elastic stiffness in compression of the spring being identical to said elastic stiffness in traction of the spring.

4. The aircraft undercarriage according to claim 2, wherein the shock absorber presents a first elastic stiffness opposing deformation of the shock absorber along said longitudinal axis, said first elastic stiffness being several times greater than said elastic stiffness in compression of the spring along said longitudinal axis.

5. The aircraft undercarriage according to claim 1, wherein said helical spring presents a plurality of turns extending between said first and second portions of the spring.

6. The aircraft undercarriage according to claim 1, wherein the spring extends in part around the upper element and in part around the lower element.

7. The aircraft undercarriage according to claim 1, wherein the first and second portions of the spring are terminal ends of the spring.

8. The aircraft undercarriage according to claim 1, wherein the first portion of the spring is secured to the upper element via a first ball joint connection and the second portion of the spring is secured to the lower element via a second ball joint connection.

9. The aircraft undercarriage according to claim 8, wherein:
the first ball joint connection comprises first and second parts forming a first ball joint, the first part of the first ball joint connection being fixedly connected to the first portion of the spring, and the second part of the first ball joint connection being fixedly connected to the upper element; and
the second ball joint connection comprises third and fourth parts forming a second ball joint, the third part of the second ball joint connection being fixedly connected to the second portion of the spring, and the fourth part of the second ball joint connection being fixedly connected to the lower element.

10. The aircraft undercarriage according to claim 1, wherein said spring presents a minimum value Jmin of elastic stiffness in twisting opposing pivoting of the lower element relative to the upper element about said longitudinal axis, a minimum elastic stiffness in twisting being given by the following equation:

$$Jmin = Cmax / |θ1-θ2|max$$

in which Cmax is the magnitude of a maximum authorized pivoting torque for the lower element relative to the upper element about said longitudinal axis, Cmax being a predetermined value; and in which $|\theta1-\theta2|$max is a maximum authorized angle of rotation for the lower element relative to the upper element about said longitudinal axis expressed as its absolute value.

11. The aircraft undercarriage according to claim 1, wherein the undercarriage is an aircraft main undercarriage, the upper element being a main strut leg of the undercarriage and the lower element being an undercarriage rod slidably mounted to slide inside the strut leg.

12. The aircraft undercarriage according to claim 1, wherein the undercarriage is an aircraft nose undercarriage, the upper element being a tube that is pivotally mounted relative to a strut of the undercarriage.

13. The aircraft including at least one undercarriage according to claim 1.

* * * * *